United States Patent
Zikes et al.

(10) Patent No.: US 10,209,751 B2
(45) Date of Patent: Feb. 19, 2019

(54) RELAY SWITCH CONTROL AND RELATED METHODS

(71) Applicants: Bradley C. Zikes, Sunset Hills, MO (US); David L. Vie, Union, MO (US); Randy T. Ruiz, St. Peters, MO (US)

(72) Inventors: Bradley C. Zikes, Sunset Hills, MO (US); David L. Vie, Union, MO (US); Randy T. Ruiz, St. Peters, MO (US)

(73) Assignee: Emerson Electric Co., St. Louis, MO (US)

(*) Notice: Subject to any disclaimer, the term of this patent is extended or adjusted under 35 U.S.C. 154(b) by 1171 days.

(21) Appl. No.: 13/766,551

(22) Filed: Feb. 13, 2013

(65) Prior Publication Data

US 2013/0211615 A1 Aug. 15, 2013

Related U.S. Application Data

(60) Provisional application No. 61/598,574, filed on Feb. 14, 2012.

(51) Int. Cl.
*G06F 1/26* (2006.01)
*H01H 47/32* (2006.01)

(52) U.S. Cl.
CPC ............. *G06F 1/26* (2013.01); *H01H 47/32* (2013.01)

(58) Field of Classification Search
CPC .................................. G06F 1/26; H01H 47/32
USPC ........................................ 700/278, 282, 296
See application file for complete search history.

(56) References Cited

U.S. PATENT DOCUMENTS

| | | | |
|---|---|---|---|
| 2,864,049 A | 12/1958 | Sheets | |
| 3,298,192 A | 1/1967 | Morgan | |
| 3,309,602 A * | 3/1967 | Euvino | H02M 1/083 327/402 |
| 3,358,468 A | 12/1967 | Shaw | |
| 3,573,486 A | 4/1971 | Harris | |
| 3,599,006 A | 8/1971 | Harris | |
| 3,640,085 A | 2/1972 | Harris | |

(Continued)

FOREIGN PATENT DOCUMENTS

| CN | 202013526 | 10/2011 |
|---|---|---|
| CN | 201230017972.3 | 1/2012 |

(Continued)

OTHER PUBLICATIONS

Crydom, Inc., "DRH Series 3 Phase Solid State Contactors", 2015, Crydom Inc.*

(Continued)

*Primary Examiner* — Mohammad Ali
*Assistant Examiner* — Kelvin Booker
(74) *Attorney, Agent, or Firm* — Harness, Dickey & Pierce, P.L.C.; Anthony G. Fussner

(57) ABSTRACT

Exemplary embodiments are disclosed of a relay switch control configured for connection between a power source and a load. The control includes a processor having a clock upon which an operating frequency of the processor is based, and a sealed relay operable by the processor to electrically connect or disconnect the power source and the load. The relay switch control can start power to the load through the relay after a randomized time delay determined by the processor using a value of a counter of the processor. The counter is updated as a function of cycles of the clock.

23 Claims, 13 Drawing Sheets

(56) References Cited

U.S. PATENT DOCUMENTS

| | | | | |
|---|---|---|---|---|
| 3,913,380 A * | 10/1975 | Jones et al. | | 73/35.02 |
| 3,949,595 A * | 4/1976 | Jones et al. | | 73/863.81 |
| 4,044,551 A * | 8/1977 | Nelson et al. | | 60/790 |
| 4,071,709 A * | 1/1978 | Lee et al. | | 379/252 |
| 4,084,406 A * | 4/1978 | Brenneman | | F04D 27/0284 318/779 |
| 4,128,854 A | 12/1978 | Ruminsky | | |
| 4,135,860 A * | 1/1979 | van Nederkassel | | 417/12 |
| 4,241,400 A * | 12/1980 | Kiefer | | D06F 33/02 134/57 D |
| 4,245,309 A * | 1/1981 | Kiefer | | G05B 19/0426 134/57 D |
| 4,245,310 A * | 1/1981 | Kiefer | | D06F 33/02 134/57 D |
| 4,265,371 A * | 5/1981 | Desai | | G07F 13/065 222/129.4 |
| 4,292,813 A * | 10/1981 | Paddock | | 62/158 |
| 4,309,876 A * | 1/1982 | Leonard et al. | | 62/79 |
| 4,344,027 A * | 8/1982 | Karlicek | | H02J 3/14 322/32 |
| 4,404,697 A | 9/1983 | Hatcher | | |
| 4,418,398 A * | 11/1983 | Hornung | | D06F 33/02 700/12 |
| 4,419,619 A * | 12/1983 | Jindrick | | H02M 3/33515 307/31 |
| 4,481,786 A * | 11/1984 | Bashark | | G01R 31/2825 318/438 |
| 4,631,627 A * | 12/1986 | Morgan | | 361/153 |
| 4,740,882 A * | 4/1988 | Miller | | G05B 19/042 340/3.1 |
| 4,843,833 A * | 7/1989 | Polkinghorne | | F25D 17/065 62/180 |
| 4,922,363 A * | 5/1990 | Long et al. | | 361/3 |
| 5,013,990 A * | 5/1991 | Weber | | H02P 23/26 318/812 |
| 5,280,424 A * | 1/1994 | Rony | | B01J 19/0006 422/108 |
| 5,284,024 A * | 2/1994 | Hanson et al. | | 62/126 |
| 5,303,560 A * | 4/1994 | Hanson et al. | | 62/126 |
| 5,325,315 A * | 6/1994 | Engel | | H01H 47/325 702/105 |
| 5,329,417 A | 7/1994 | Kniepkamp et al. | | |
| 5,423,192 A * | 6/1995 | Young | | H02P 6/08 62/215 |
| 5,454,229 A * | 10/1995 | Hanson et al. | | 62/126 |
| 5,456,256 A * | 10/1995 | Schneider et al. | | 600/445 |
| 5,492,273 A * | 2/1996 | Shah | | H02P 6/085 236/44 A |
| 5,530,615 A * | 6/1996 | Miller | | H01H 9/56 307/141 |
| 5,544,036 A * | 8/1996 | Brown, Jr. | | G05D 23/1905 340/12.52 |
| 5,572,438 A * | 11/1996 | Ehlers | | G01R 21/133 307/37 |
| 5,592,058 A * | 1/1997 | Archer | | H02P 6/085 318/400.09 |
| 5,623,836 A | 4/1997 | Mrozinsky et al. | | |
| 5,627,417 A * | 5/1997 | Clarke | | 307/141 |
| 5,687,139 A * | 11/1997 | Budney | | G05D 23/1923 307/141.4 |
| 5,713,724 A * | 2/1998 | Centers et al. | | 417/53 |
| 5,772,214 A * | 6/1998 | Stark | | 277/345 |
| 5,886,504 A * | 3/1999 | Scott | | B23K 9/1062 322/15 |
| 5,900,722 A * | 5/1999 | Scott | | B23K 9/1062 290/49 |
| 5,911,747 A * | 6/1999 | Gauthier | | 62/176.6 |
| 5,946,210 A * | 8/1999 | Montminy et al. | | 700/97 |
| 5,982,596 A * | 11/1999 | Spencer | | H02H 3/00 361/102 |
| 6,018,200 A * | 1/2000 | Anderson | | B23K 9/1062 290/1 |
| 6,102,665 A * | 8/2000 | Centers et al. | | 417/18 |
| 6,118,186 A * | 9/2000 | Scott | | H02P 9/04 290/1 A |
| 6,121,758 A * | 9/2000 | Bellina et al. | | 323/211 |
| 6,195,243 B1 * | 2/2001 | Spencer | | H02H 3/00 361/64 |
| 6,212,894 B1 | 4/2001 | Brown et al. | | |
| 6,220,043 B1 | 4/2001 | Chaney, Jr. et al. | | |
| 6,246,831 B1 * | 6/2001 | Seitz et al. | | 392/486 |
| 6,247,246 B1 * | 6/2001 | Scalese et al. | | 34/259 |
| 6,285,178 B1 * | 9/2001 | Ball et al. | | 323/351 |
| 6,318,966 B1 * | 11/2001 | Madara et al. | | 417/12 |
| 6,320,348 B1 | 11/2001 | Kadah | | |
| 6,464,012 B1 * | 10/2002 | Strickland | | E21B 43/121 166/162 |
| 6,529,590 B1 * | 3/2003 | Centers | | 379/106.01 |
| 6,615,594 B2 | 9/2003 | Jayanth et al. | | |
| 6,647,346 B1 | 11/2003 | Zikes | | |
| 6,727,682 B1 * | 4/2004 | Tobin | | 324/117 R |
| 6,728,600 B1 | 4/2004 | Contaldo et al. | | |
| 6,745,584 B2 | 6/2004 | Pham et al. | | |
| 6,798,341 B1 * | 9/2004 | Eckel | | G01K 1/045 340/12.32 |
| 7,032,397 B1 | 4/2006 | Mueller et al. | | |
| 7,100,382 B2 | 9/2006 | Butler et al. | | |
| 7,289,887 B2 | 10/2007 | Rodgers | | |
| 7,298,148 B2 | 11/2007 | Drake et al. | | |
| 7,392,115 B2 | 6/2008 | Schindler | | |
| 7,392,661 B2 | 7/2008 | Alles | | |
| 7,444,824 B1 | 11/2008 | Butler et al. | | |
| 7,464,561 B1 | 12/2008 | Butler et al. | | |
| 7,672,095 B2 | 3/2010 | Drake et al. | | |
| 7,679,307 B2 | 3/2010 | Mills, Jr. et al. | | |
| 7,683,795 B2 * | 3/2010 | Bjorn | | 340/650 |
| 7,694,525 B2 | 4/2010 | Butler et al. | | |
| 7,705,484 B2 | 4/2010 | Horst | | |
| 7,715,951 B2 | 5/2010 | Forbes, Jr. et al. | | |
| 7,748,225 B2 | 7/2010 | Butler et al. | | |
| 7,908,117 B2 | 3/2011 | Steinberg et al. | | |
| 7,978,059 B2 | 7/2011 | Petite et al. | | |
| 8,700,224 B2 * | 4/2014 | Mathiowetz | | H02J 3/14 307/85 |
| 2001/0010032 A1 * | 7/2001 | Ehlers | | G05B 15/02 702/62 |
| 2001/0056544 A1 * | 12/2001 | Walker | | 713/200 |
| 2002/0020175 A1 * | 2/2002 | Street | | F25B 49/02 62/132 |
| 2003/0037555 A1 * | 2/2003 | Street et al. | | 62/175 |
| 2004/0016241 A1 * | 1/2004 | Street | | G05D 23/24 62/129 |
| 2004/0016244 A1 * | 1/2004 | Street | | F25B 49/02 62/132 |
| 2004/0016251 A1 * | 1/2004 | Street | | F25B 49/02 62/209 |
| 2004/0016253 A1 * | 1/2004 | Street | | F25B 49/02 62/228.5 |
| 2004/0024495 A1 * | 2/2004 | Sunderland | | F25B 49/02 700/299 |
| 2004/0042772 A1 * | 3/2004 | Whitford | | F24H 9/2021 392/498 |
| 2004/0044493 A1 * | 3/2004 | Coulthard | | 702/122 |
| 2004/0150384 A1 * | 8/2004 | Holle et al. | | 324/110 |
| 2006/0120007 A1 * | 6/2006 | Legatti | | H01H 47/32 361/160 |
| 2007/0035907 A1 * | 2/2007 | Doering | | A01G 25/162 361/160 |
| 2007/0203860 A1 | 8/2007 | Golden et al. | | |
| 2007/0290628 A1 * | 12/2007 | Altonen | | G06F 3/03547 315/291 |
| 2007/0290874 A1 * | 12/2007 | Nearhoof | | H05B 37/0209 340/815.46 |
| 2008/0095638 A1 * | 4/2008 | Branecky | | F04D 15/0066 417/43 |
| 2008/0095639 A1 * | 4/2008 | Bartos | | F04D 15/00 417/44.11 |
| 2008/0095640 A1 * | 4/2008 | Branecky | | F04D 15/00 417/44.11 |
| 2008/0252141 A1 | 10/2008 | Horst | | |

(56) References Cited

U.S. PATENT DOCUMENTS

| | | | |
|---|---|---|---|
| 2008/0258631 A1* | 10/2008 | Wu et al. .................... | 315/129 |
| 2009/0024545 A1 | 1/2009 | Golden et al. | |
| 2009/0206059 A1* | 8/2009 | Kiko ..................... | H02J 3/14 |
| | | | 218/143 |
| 2009/0228388 A1 | 9/2009 | Axelrod et al. | |
| 2009/0284875 A1* | 11/2009 | Ford et al. ................... | 361/13 |
| 2009/0312968 A1 | 12/2009 | Phillips | |
| 2009/0319212 A1* | 12/2009 | Cech ................. | B60R 21/0136 |
| | | | 702/65 |
| 2010/0070101 A1 | 3/2010 | Benes et al. | |
| 2010/0070103 A1 | 3/2010 | Fleck et al. | |
| 2010/0094470 A1 | 4/2010 | Besore et al. | |
| 2011/0002792 A1* | 1/2011 | Bartos .................. | F04D 15/00 |
| | | | 417/44.1 |
| 2011/0006123 A1 | 1/2011 | Sharp | |
| 2011/0011557 A1 | 1/2011 | Shelton, Jr. | |
| 2011/0106316 A1 | 5/2011 | Drew et al. | |
| 2011/0110794 A1* | 5/2011 | Mayleben ............. | F04B 23/021 |
| | | | 417/53 |
| 2011/0115448 A1* | 5/2011 | Elliott ............... | H05B 37/0254 |
| | | | 323/235 |
| 2011/0115460 A1* | 5/2011 | Elliott ................... | H01H 50/02 |
| | | | 323/285 |
| 2011/0118890 A1* | 5/2011 | Parsons .................. | H02J 3/14 |
| | | | 700/295 |
| 2011/0133655 A1* | 6/2011 | Recker .................... | H02J 9/02 |
| | | | 315/159 |
| 2012/0000218 A1 | 1/2012 | Nystrom | |
| 2012/0221150 A1* | 8/2012 | Arensmeier ....... | G05B 23/0224 |
| | | | 700/276 |
| 2013/0057998 A1* | 3/2013 | Li et al. ................. | 361/187 |
| 2013/0158838 A1* | 6/2013 | Yorke et al. ................. | 701/103 |
| 2014/0180487 A1* | 6/2014 | Bull ..................... | H04L 12/12 |
| | | | 700/295 |
| 2014/0246925 A1* | 9/2014 | Porter .................. | H02J 3/14 |
| | | | 307/115 |
| 2017/0040799 A1* | 2/2017 | Divan .................... | H02J 3/12 |
| 2017/0308072 A1* | 10/2017 | Arensmeier ....... | G05B 23/0224 |

FOREIGN PATENT DOCUMENTS

| | | |
|---|---|---|
| CN | 201230017974.2 | 1/2012 |
| WO | WO2010/111535 | 9/2010 |

OTHER PUBLICATIONS

Semiconductor Components Industries, LLC, "Zero Voltage Switch Power Controller", Jan. 2006, Rev. 9, Pub. Order No. UAA2016/D.*

Andreycak, B., "Zero Voltage Switching Resonant Power Conversion", 2001, Texas Instruments Incorporated.*

Andreycak, B., "Zero Voltage Switching Resonant Power Conversion", 1999, Unitrode Application Note, U-138.*

Crydom Inc., "Output Switching Functions of Solid-State Relays", Aug. 2011.*

U.S. Appl. No. 13/005,306, filed Jan. 12, 2011, David Scott Drew.

U.S. Appl. No. 13/370,095, filed Feb. 9, 2012, Drew et al.

U.S. Appl. No. 29/412,351, filed Feb. 2, 2012, Ling et al.

U.S. Appl. No. 29/412,350, filing Feb. 2, 2012, Ling et al.

"Comverge IntelliTemp 900™", www.comverge.com, Apr. 2011, 2 pgs.

Canadian Office Action dated Jan. 20, 2015, issued in co-pending Canadian Application No. 2,806,950 which claims priority to the same parent application as the instant application, 3 pgs.

\* cited by examiner

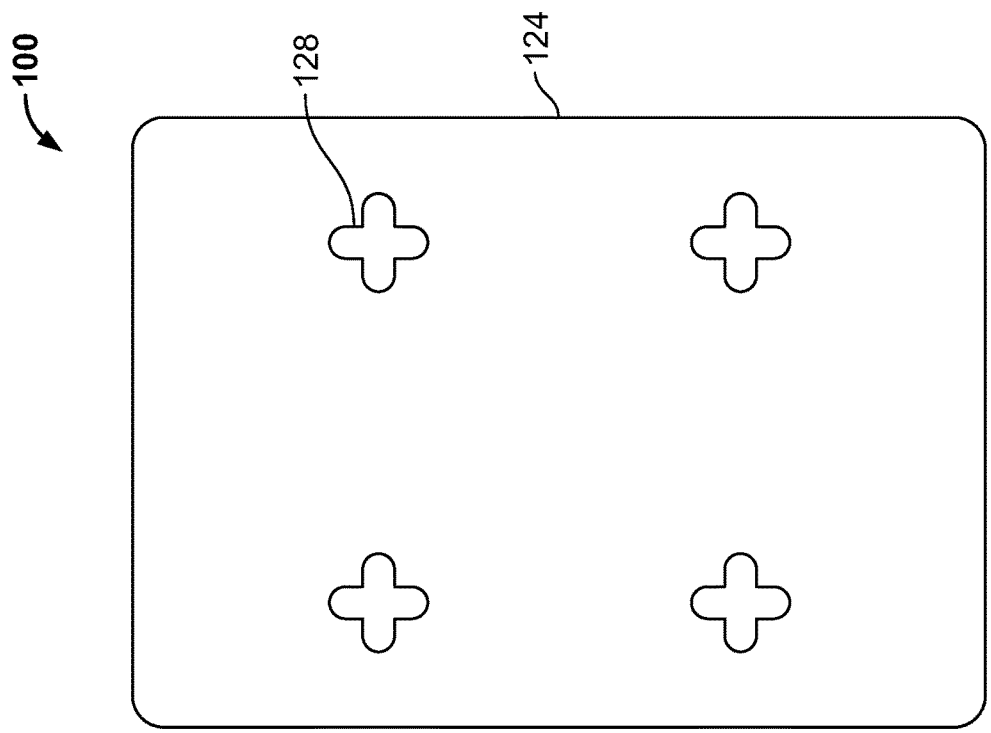
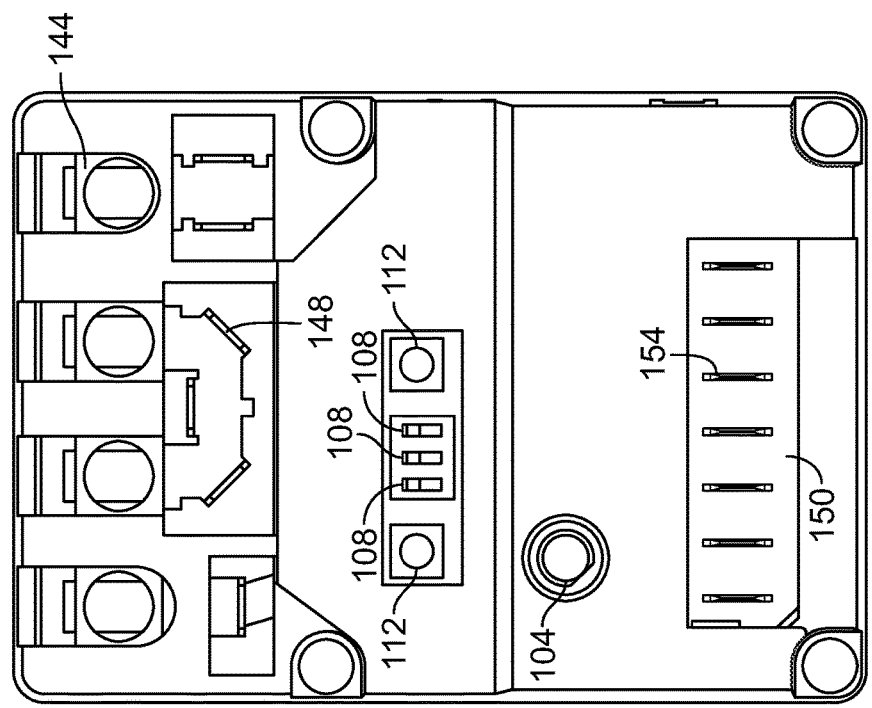
FIG. 8
FIG. 7

RELAY SWITCH CONTROL AND RELATED METHODS

CROSS-REFERENCE TO RELATED APPLICATION

This application claims the benefit of U.S. Provisional Application No. 61/598,574, filed on Feb. 14, 2012. The entire disclosure of the above application is incorporated herein by reference.

FIELD

The present disclosure relates to relay switch control and related methods.

BACKGROUND

This section provides background information related to the present disclosure which is not necessarily prior art.

Climate control systems such as an air conditioning or heat pump systems typically include components such as compressors that are turned on and off by contactors in response to thermostat signals. Such contactors are relatively expensive, and frequently provide no functionality except to connect and disconnect system components to and from electric power.

SUMMARY

This section provides a general summary of the disclosure, and is not a comprehensive disclosure of its full scope or all of its features.

Exemplary embodiments are disclosed herein for relay switch controls. An exemplary embodiment is directed to a relay switch control configured for connection between a power source and a load. The control includes a processor having a clock upon which an operating frequency of the processor is based, and a relay operable by the processor to electrically connect or disconnect the power source and the load. The relay switch control is further configured to start power to the load through the relay after a randomized time delay determined by the processor using a value of a counter of the processor. The counter is updated as a function of cycles of the clock.

Another exemplary embodiment of a relay switch control includes a processor and a relay operable by the processor to electrically connect or disconnect a power source and a load. The relay is substantially enclosed in a seal. The relay switch control is configured for connection as a unit between the power source and the load.

Another exemplary embodiment of a relay switch control is configured for connection between a power source and a compressor in a climate control system. The control includes a processor; and a lockout selection device in communication with the processor. The lockout selection device is selectively operable by a user to enable or disable an operational lockout of the compressor after a predetermined number of failed attempts to start the compressor.

Also disclosed herein are exemplary methods related to relay switch control. In one exemplary implementation, the disclosure is directed to a method of providing a random start capability for a line-powered apparatus. The method is performed by a processor of a control for the apparatus. The processor has an internal clock and a counter that is updated based on cycles of the clock. The method includes detecting a signal indicating startup of line power to the apparatus. Upon detecting a zero cross of the signal, the processor stores at least a portion of a current value of the counter. The method further includes combining at least a portion of the stored value with a value of a cycle of the signal to obtain a randomized number for use as a time delay before startup of the apparatus.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a top view of the control shown in FIG. 1;

FIG. 8 is a bottom view of the control shown in FIG. 1;

Corresponding reference numerals indicate corresponding parts throughout the several views of the drawings.

DETAILED DESCRIPTION

Figure 1:
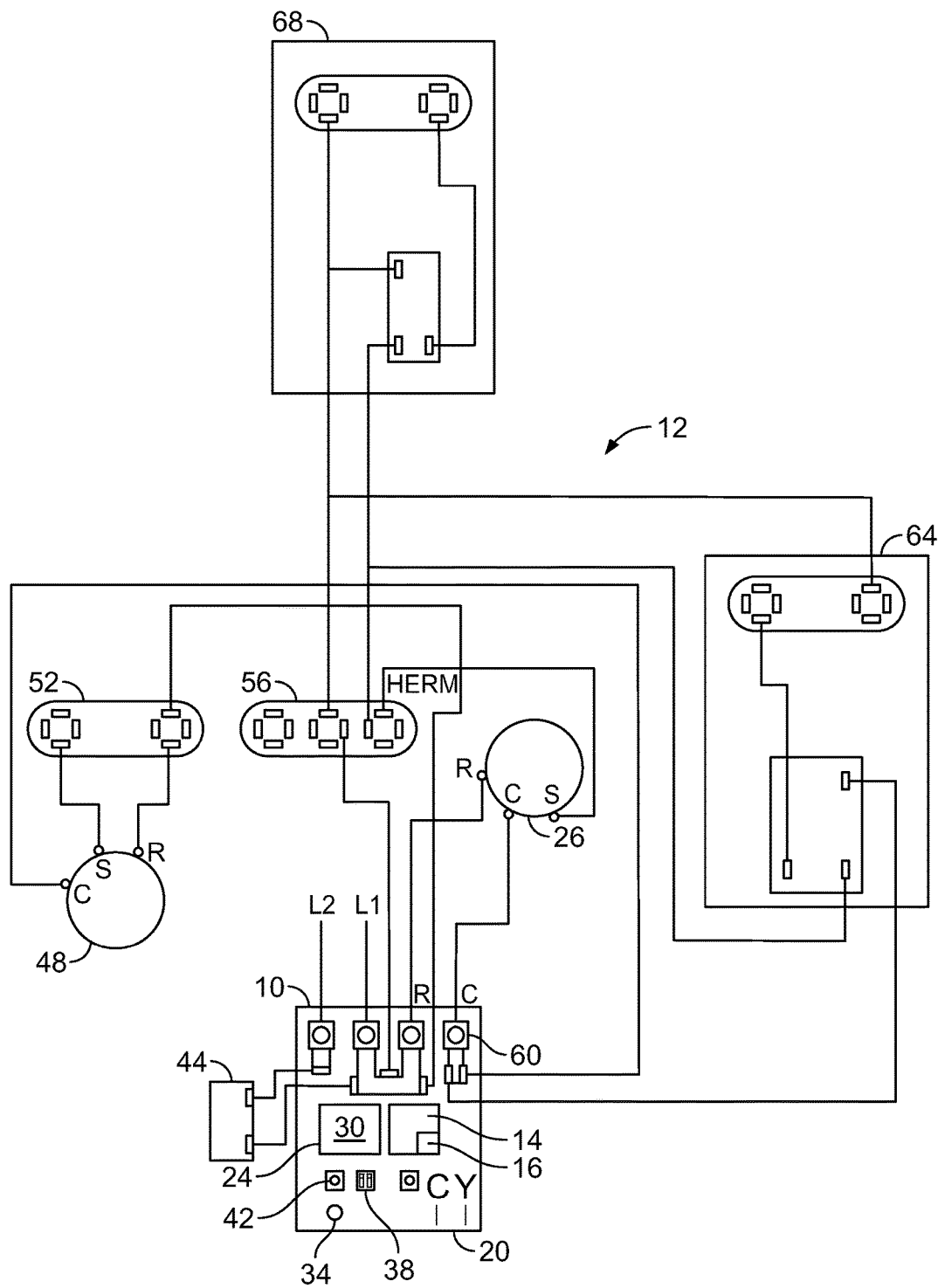
FIG. 1 is a schematic wiring diagram illustrating an exemplary embodiment of a relay switch control connected with components of an HVAC system in accordance with an exemplary implementation of the present disclosure.

Example embodiments will now be described more fully with reference to the accompanying drawings.

Exemplary embodiments are disclosed of controls, controllers, and/or contactors that may be used to replace existing HVAC contactors, including but not limited to conventional contactors used in air conditioner outdoor units. The inventors have observed that conventional definite purpose (DP) contactors may fail due to arcing from the opening and closing of their contacts under load at other than zero cross switching points of a sinusoid load current. Further, conventional DP contactors may fail due to dust, dirt, bugs, and other contaminants getting between the contacts and creating a barrier to operation. HVAC systems with contactors can also exhibit reduced reliability as a result of short cycling, starting and running under low voltage conditions, and the cycling on of their automatic reset high and low pressure switches.

The inventors also have observed that in a metropolitan area, thousands of air conditioners and heat pumps can all be energized at the same time. If power were to be lost on the utility grid, then typically all of these units would shut down at the same time. When power is restored after such an event, the vast majority of the units probably would still be receiving a demand for heat or cool, in which case these units would all try to turn on at the same time. These units typically would have a very large inrush current. In response, the line voltage could drop, creating an even higher electrical current demand due to typical compressor operating characteristics. The higher demand could potentially overload the electric utility, which could shut down in response.

Accordingly, in some exemplary embodiments, a relay switch control disclosed herein may be used as a replacement for a conventional contactor used, e.g., to switch a load such as an air conditioning compressor. In various exemplary embodiments, a relay switch control is configured for connection between a power source and a load, e.g., in a climate control system. The control includes a processor and a relay operable by the processor to electrically connect or disconnect the power source and the load. The relay is substantially enclosed in a seal. The relay switch control is configured for connection as a unit between the power source and the load.

In some exemplary embodiments, a relay switch control includes a processor having a clock upon which an operating frequency of the processor is based. The relay switch control also has a relay operable by the processor to electrically connect or disconnect the power source and the load. The processor is configured to start power to the load through the relay after a randomized time delay determined by the processor using a value of a counter of the processor. The counter is updated as a function of cycles of the clock.

In various exemplary embodiments, a relay switch control configured for connection between a power source and a compressor in a climate control system includes a processor and a lockout selection device in communication with the processor. The lockout selection device is selectively operable by a user to enable or disable an operational lockout of the compressor after a predetermined number of failed attempts to start the compressor.

Exemplary implementations of methods related to relay switch controls also are provided. One example method may be used to provide a random start capability for a line-powered apparatus, e.g., a motor in a climate control system. The method is performed by a processor having an internal clock and a counter that is updated based on cycles of the clock. The method includes detecting a signal indicating startup of line power to the apparatus. Upon detecting a zero cross of the signal, the processor stores at least a portion of the current value of the counter, and combines at least a portion of the stored value with a value of a cycle of the signal to obtain a randomized number for use as a time delay before startup of the apparatus.

Although various exemplary embodiments are described herein in relation to a compressor motor, the disclosure is not so limited. Various embodiments are contemplated in relation to various types of loads, including but not limited to motors, that may be switched through contactors/relays. Embodiments of relay switch controls also are contemplated in relation to various types of systems, including but not limited to climate control systems, HVAC, refrigeration systems, pools, spas, hot tubs, water wells, etc. Additionally, although the term "relay switch control" is used herein to refer to various exemplary embodiments, it is contemplated that various types of controls, controllers, hardware, software, combinations thereof, etc. could be used. It also is contemplated that various types of processors, microprocessors, computers, etc. could be utilized in accordance with various implementations of the disclosure.

In exemplary embodiments, a relay switch control may include a high-reliability, optically-controlled latching relay, sealed against the intrusion of insects and debris. Various embodiments may provide line voltage brownout protection by de-energizing a compressor, e.g., in the event of calls for compressor operation during line voltage drops. Various embodiments may provide short cycle protection, e.g., by activating a short delay before normal operation for compressors in air conditioners and heat pumps. Relay switch controllers or controls in exemplary embodiments may also detect inputs from high and low pressure switches and lock out compressor operation, e.g., when multiple consecutive pressure switch openings are detected. Additionally or alternatively, example embodiments of relay switch controls may include a cycle counter feature that a user may activate by push button, to determine and display how many times a compressor relay has turned on. Additionally or alternatively, example embodiments of relay switch controls may include a random start delay timer function, e.g., as further described below.

An example embodiment of a relay switch control is configured for use as a field replacement suitable for replacing any of a plurality of different configurations, e.g., one-pole and two-pole configurations, of DP contactors. Example embodiments are easy to install, e.g., using lug connectors and a mounting plate that can be installed typically in the same location previously occupied by a conventional contactor. In various embodiments, relay switch controls can be self-powered and/or can be wired into existing wiring without requiring any new wires.

One example of a relay switch control is indicated in FIG. 1 by reference number 10. The relay switch control 10 is connected with components of an HVAC system indicated generally by reference number 12. The control 10 includes a processor 14 and memory 16, e.g., a non-volatile electrically erasable programmable read-only memory (EEPROM), etc. The processor 14 receives control signals, e.g., signals from an indoor thermostat (not shown), via Y and C terminals 20.

The control 10 also includes a relay 24 electrically connected between line voltages (L1, L2) and a compressor motor 26. The relay 24 is operable by the processor 14 to electrically connect or disconnect the line voltages (L1, L2) and the compressor motor 26. In the present embodiment, the relay 24 is substantially enclosed in a seal 30, e.g., a coating of epoxy glue, configured to prevent the intrusion, e.g., of insects and debris into contacts (not shown) of the relay 24.

In the present embodiment, the relay 24 is a latching relay. With the aid, e.g., of optical sensing of sparking at the relay 24, the processor 14 is configured to provide "zero cross" switching of current through the relay 24 such that current is switched through the relay 24 at or very close to zero crossing of the line voltage. Such switching may be performed, e.g., as disclosed in U.S. Pat. No. 7,464,561, the entire disclosure of which is incorporated herein by reference. Arcing and contact damage to the relay 24 may thereby be reduced or eliminated.

The control 10 includes an LED 34 and a plurality of dipswitches 38 (in the present example, two dipswitches 38) disposed, e.g., between two push buttons 42. Fewer or additional push buttons could be provided in other embodiments. A crankcase heater 44 may also be connected to line voltages (L1, L2). The crankcase heater 44 may be, e.g., a "belly band" crankcase heater. In the present embodiment, the control 10 is also connected with a fan motor 48, a fan capacitor 52, and a compressor capacitor 56.

In the present embodiment, R and C terminals of the control 10 are connected, e.g., via lug type connectors 60, with R (rm) and C (common) terminals of the compressor motor 26. An S (start) terminal of the compressor motor 26 is connected with a HERM terminal of the compressor capacitor 56. The control 10 is connected with a C (common) terminal of the fan motor 48. The control 10 thus may switch the fan motor 48 on or off with the compressor motor 26 through the relay 24. The fan motor 48 may be, but is not limited to, e.g., a one-speed permanent split capacitor (PSC) motor, e.g., for an outdoor fan. R (run) and S (start) terminals of the fan motor 48 are connected with the fan capacitor 52. The example control 10 is configured to be compatible with most, if not all, types of single-speed PSC outdoor fan motor wiring including 3-wire, 4-wire, and universal replacement motors.

The example control 10 is also configured so that it is compatible with both dual capacitor (separate compressor and outdoor fan) and single capacitor (combined compressor and outdoor fan) systems. The example control 10 is further configured to be compatible with both 2-wire and 3-wire hard start kits. To this end, FIG. 1 illustrates an optional 3-wire hard start kit 64 and an optional 2-wire kick start kit 68.

Figure 2:
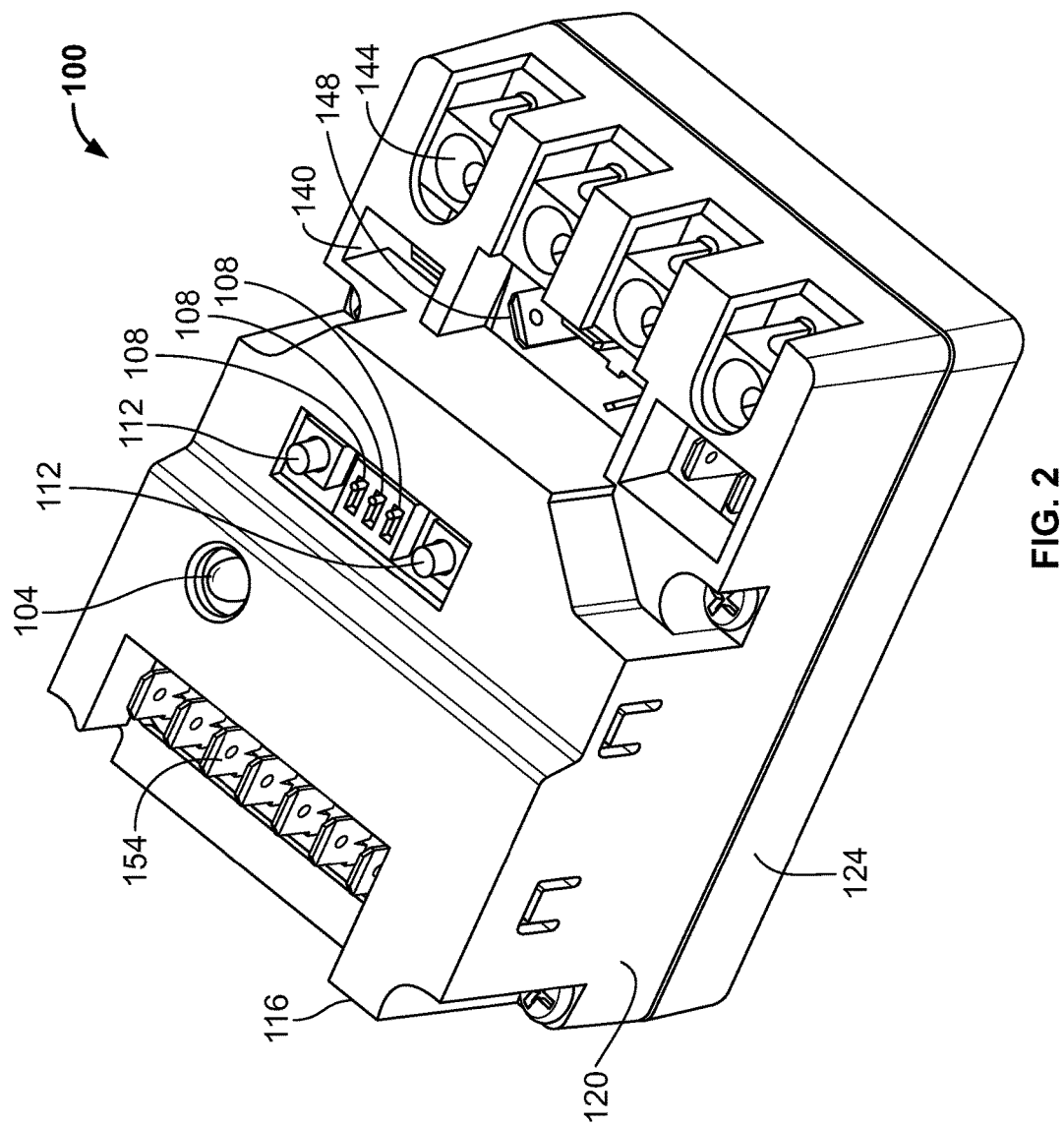
FIG. 2 is a perspective view of an exemplary embodiment of a relay switch control.

Another exemplary embodiment of a relay switch control is indicated generally in FIGS. 2 through 8 by reference number 100. The control 100 includes a microprocessor and sealed relay, e.g., as described with reference to FIG. 1. As shown in FIG. 2, the control 100 includes an indicator light 104, e.g., a multi-color LED, which in the present example embodiment is a tri-color LED. The indicator light 104 is operable by a microprocessor (not shown) of the control 100 to indicate faults, status and/or to indicate the number of cycles through which the relay has cycled. The control 100 includes three dipswitches 108 and two push buttons 112.

The control 100 includes a two-piece housing 116, e.g., a two-piece plastic housing with integral mounting features. The two-piece housing 116 includes an upper housing portion or cover 120 and a lower housing portion 124. A microprocessor and sealed relay are provided beneath the upper cover 120 and so are not visible in FIG. 2. The housing 116 includes openings 140 in the upper housing portion or cover 120 for the terminal connections and connections to the compressor and the fan. Lug connectors 144 are provided for line voltage inputs and compressor outputs, e.g., as discussed with reference to FIG. 1. Connectors 148 are provided for connection of compressor and fan capacitors, fan, etc. to line voltages (L1, L2) e.g., as discussed with reference to FIG. 1.

Figure 3:
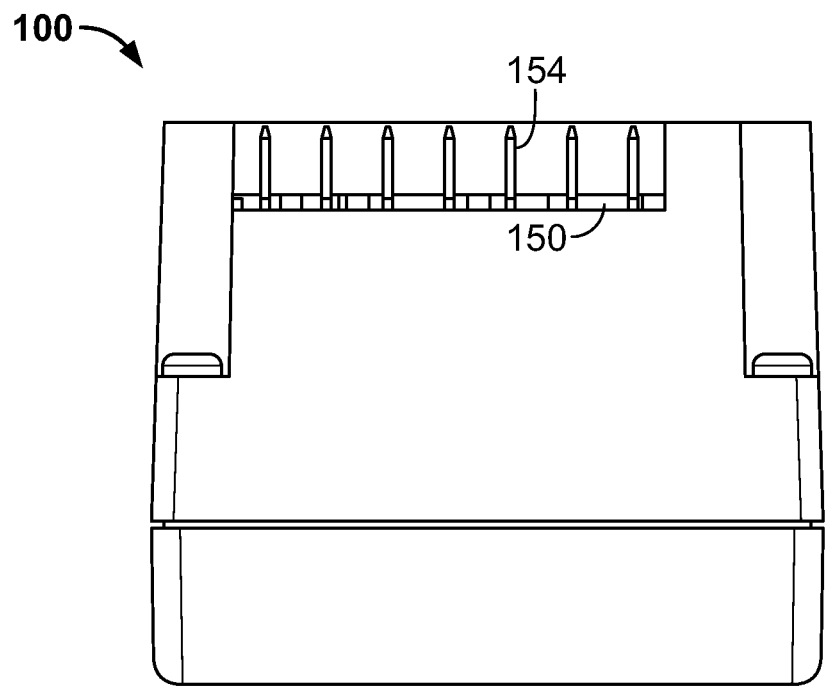
FIG. 3 is a front view of the control shown in FIG. 1.
Figure 4:
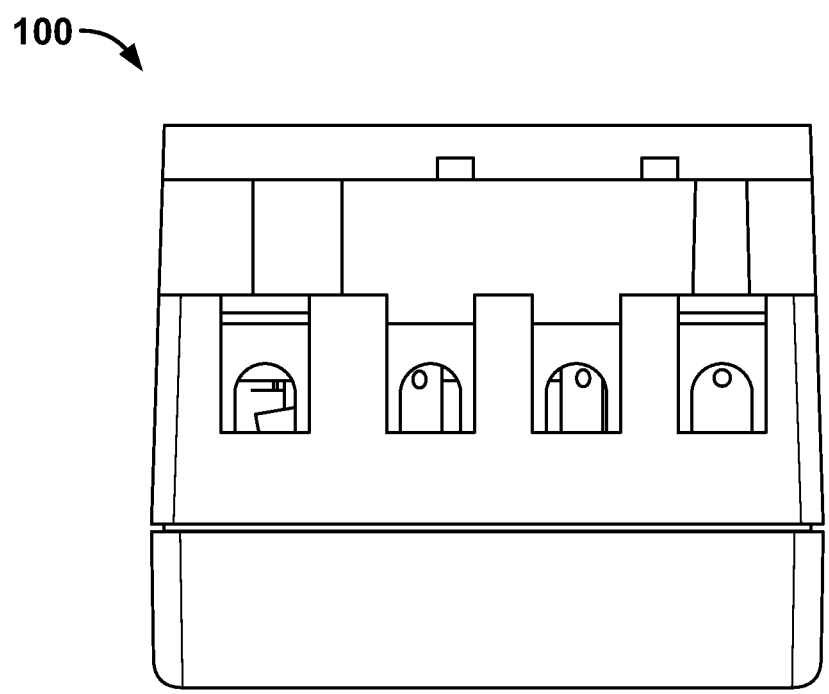
FIG. 4 is a back view of the control shown in FIG. 1.
Figure 5:
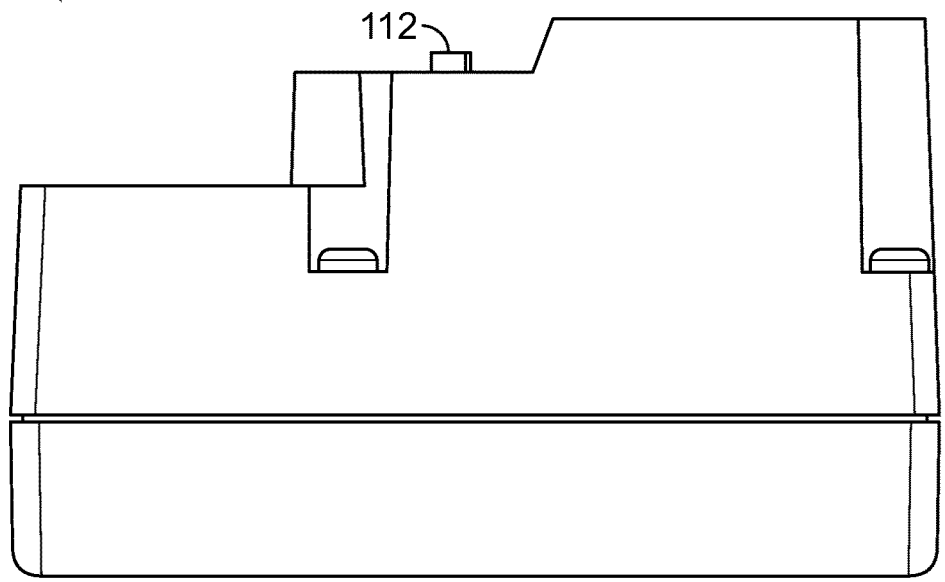
FIG. 5 is a right side view of the control shown in FIG. 1.
Figure 6:
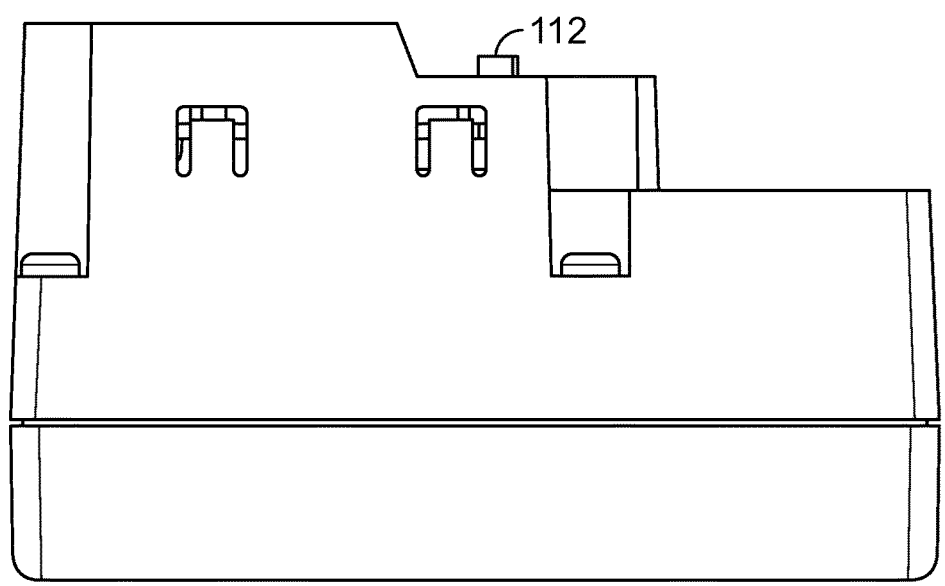
FIG. 6 is a left side view of the control shown in FIG. 1.

As shown in FIG. 3, the control 100 includes a printed circuit board (PCB) 150 on which the microprocessor and sealed relay are provided. Although the PCB 150 is horizontally situated relative to the housing bottom portion 124, a PCB could be oriented in other directions, e.g., vertically within the housing in other relay switch control embodiments. Connectors 154 are provided on the PCB 150 for connection of the control 100 with a thermostat (not shown.)

In various embodiments, other or additional components of a climate control system may be connected with the control 100, including but not limited to high pressure and low pressure switches, temperature sensors for suction and/or liquid lines from a compressor, etc. In some example embodiments, an ambient temperature sensor may be connected with the control 100 to enable a comparison between ambient temperature and a threshold temperature to determine whether to switch off a heat pump compressor.

FIG. 8 illustrates a bottom view of the control 100 showing a plurality of mounting holes 128, which may be configured to match with existing standard contactor holes for mounting. In the example control 100, the mounting holes 128 are oblong or elongated in both directions to provide added positioning flexibility. Components of the control 100 may be configured, e.g., assembled, to be snapped into the lower housing piece or portion 124, and then the top cover or upper housing portion 120 may be attached.

The relay switch control 100 may be provided, e.g., for use in relation to single stage air conditioning and heat pump condensing units with single-phase reciprocating or scroll compressors operating on standard residential and/or commercial (delta and/or wye) power configurations. The control 100 may be used as an aftermarket field upgrade device to replace a traditional contactor, while incorporating additional value-added features such as short cycle protection, brownout protection, random start delay, cycle count retention and light indicator display. In various exemplary embodiments, a relay switch control is configured to operate using limited indoor unit input, e.g., from only two wires (Y1, C). Additionally, various embodiments may provide for control of a two-stage compressor and thus may include an additional input (Y2) terminal and means for switching a second stage on/off. An example relay switch control may have brownout protection, e.g., similar to that disclosed in U.S. Pat. No. 6,647,346, the entire disclosure of which is incorporated herein by reference.

Various relay switch control embodiments include a single relay for fan and compressor. But in other exemplary embodiments, a relay switch control may include more than one relay, e.g., as disclosed in U.S. Pat. No. 7,100,382, U.S. Pat. No. 7,444,824, U.S. Pat. No. 7,464,561, and/or U.S. Pat. No. 7,694,525, the entire disclosures of which are incorporated herein by reference.

The relay switch control 100 may be used as a field replacement for a standard electromechanical contactor. A typical reason for the failure of standard open frame contactors is the intrusion into the contact area of insects, which foul the contacts and cause the contacts to fail. By using a sealed relay, the insect problem can be avoided and possibly eliminated.

The dipswitches 108 of the control 100 may be used to provide various features. For example, one dipswitch 108 may be used to select/set a short cycle delay of, e.g., 0 or 180 seconds. A second dipswitch 108 may be used to select or deselect brownout protection. In various embodiments, a compressor lockout feature is provided through dipswitch(es) 108. The lockout feature allows an installer to select how many failed attempts to start a compressor connected to the control 100 are to be allowed before the control 100 locks out the compressor. This feature can help protect a compressor and motor from damage, e.g., if a HVAC system needs service. In some embodiments, when a relay switch control locks out the compressor, a message is displayed, e.g., on a thermostat, to call for servicing. In some embodiments a setting for the dipswitch(es) 108 is provided that prevents lock out of the compressor, regardless of the number of failed starts.

In various embodiments, fewer than three, or more than three, dipswitches may be provided on a relay switch control. Alternatively, or additionally, a control may include a rotary selected switch and/or jumper. Example dipswitch settings may be provided as shown in Table 1.

TABLE 1

| Dipswitch | Description | PCB Silkscreen | Default Setting |
|---|---|---|---|
| SW1-1 | Short Cycle Delay Time | DELAY | 180 seconds |
| SW1-3 | Pressure Switch Lockout | LOCK | ON (lockout active) |
| SW1-2 | Brownout Protection | BRNOUT | ON (protection active) |

In various embodiments, a relay switch control may include one or more indicators, such as one or more multi-color LEDs, a plurality of single colored LEDs, other suitable lightsources, etc. In the exemplary embodiment shown in FIGS. 2-9, the tri-color LED 104 of the control 100 is configured for operation based on inputs from the push button(s) 112. By way of example only, alternative embodiments may include one or more other or additional indicators besides tri-color LEDs, e.g., as disclosed in U.S. Pat. No. 6,615,594, U.S. Pat. No. 6,745,584, U.S. Pat. No. 7,032,397, and/or U.S. Pat. No. 7,672,095, the entire disclosures of which are incorporated herein by reference. By way of example only, a relay switch control may be configured so as to control operation of its relay contacts and to visually communicate fault information as disclosed in U.S. Pat. No. 7,298,148, the entire disclosure of which is incorporated herein by reference.

In the exemplary embodiment of FIGS. 2-9, the tri-color LED indicator 104 is operable to indicate the number of cycles the relay has cycled, thereby indicating the number of cycles of a compressor and/or other motor connected thereto. Additionally or alternatively, the tri-color LED indicator 104 is operable to indicate detected faults and/or status conditions. Detected faults may be stored in memory (such as the EEPROM 16 of the control 10 of FIG. 1). If power is lost, in various embodiments, a relay switch control retains the last stored fault for display. Referring again to the control 100, faults and status conditions may be indicated, e.g., by color(s) and/or "blink" rate(s) of the LED indicator 104. Operation of the LED indicator 104 depends on which push button is depressed. The example control 100 has two push buttons 112, one indicated as "TEST" and the other indicated as "COUNT". The operation and function of the tri-color LED indicator 104 is as shown in Table 2 in regard to example status and fault conditions that may be displayed through the tri-color LED. Indications of other or additional faults and/or status conditions may be provided in various embodiments.

TABLE 2

| LED DISPLAY | BOARD STATUS | THERMOSTAT "L" OUTPUT | STORED FAULT? |
|---|---|---|---|
| Off | No Power | None | No |
| Green slow flash | In Standby | None | No |
| Green solid on | Normal operation | None | No |
| Green fast flash | Short cycle delay | None | No |
| Yellow flash | Low pressure open | None | Yes |
| Yellow solid on | Low pressure lockout | "Call For Service" flashed | Yes |
| Red flash | High pressure open | None | Yes |
| Red solid on | High pressure switch lockout | "Call For Service" flashed | Yes |
| Green to Yellow to Red (repeat) | TEST mode active | None | No |
| Green to Red (repeat) | Low line voltage | None | No |
| Red to Yellow (repeat) | No stored faults | None | No |

In the present embodiment, the operation and functionality of the onboard push buttons 112 ("TEST" and "COUNT") may be as follows.

A. Pushing the "TEST" button (e.g., the right-hand button 112 in FIGS. 2 and 7) for more than one second provides a five-second powered check of a connected compressor and outdoor fan. Any active delays such as the short cycle timer are bypassed. Any pressure switch lockouts are also cleared by pressing the "TEST" button, and a brownout/low voltage threshold is ignored. The tri-color LED indicator 104 alternates flashing Green-Yellow-Red while the test is active, and then resumes normal displays.

B. Pushing the "TEST" and "COUNT" buttons for more than two seconds activates a fault recall mode. The tri-color LED 104 displays the last fault for ten seconds, after which time the control 100 resumes normal displays. If the "TEST" and "COUNT" buttons are pushed for between five and ten seconds, the last fault is cleared, and the control 100 then resumes normal displays.

C. Pushing the "COUNT" button (e.g., the left-hand button 112 in FIGS. 2 and 7) for more than one second activates a cycle count display mode. In some embodiments a green LED (i.e., the LED 104 when producing green colored light) represents ten-thousands, a red LED represents thousands, and a yellow LED represents hundreds. Basic numerical rounding may be used to simplify displays. An example of a stored count of 52,518 compressor relay operations would blink out as 5 green, 2 red, 5 yellow. The cycle count is not resettable in the field in this exemplary embodiment. Other or additional push button designations, push button hold times, LED colors, LED blink rates and combinations of the foregoing could be used in various embodiments.

Referring again to the control 100, example timing periods that may be provided are shown in Table 3.

TABLE 3

| Event | Timing |
|---|---|
| Short Cycle Delay | 0 or 180 seconds |
| Field Test Pushbutton (on-board relay turned on) | 5 seconds |
| Random Start Delay on power up or brownout recovery | 5-90 seconds |

The timings above may be longer or shorter depending on the particuar application. For example, the timing may be twenty percent longer when operated with a 50 Hertz power supply.

The control 100 may be self-powered and/or may be configured with a power stealing feature in exemplary embodiments. In various embodiments, the control 100 may include its own 24 VAC power such that an installer is not required to pull additional wires to the outdoor unit.

Figure 9:
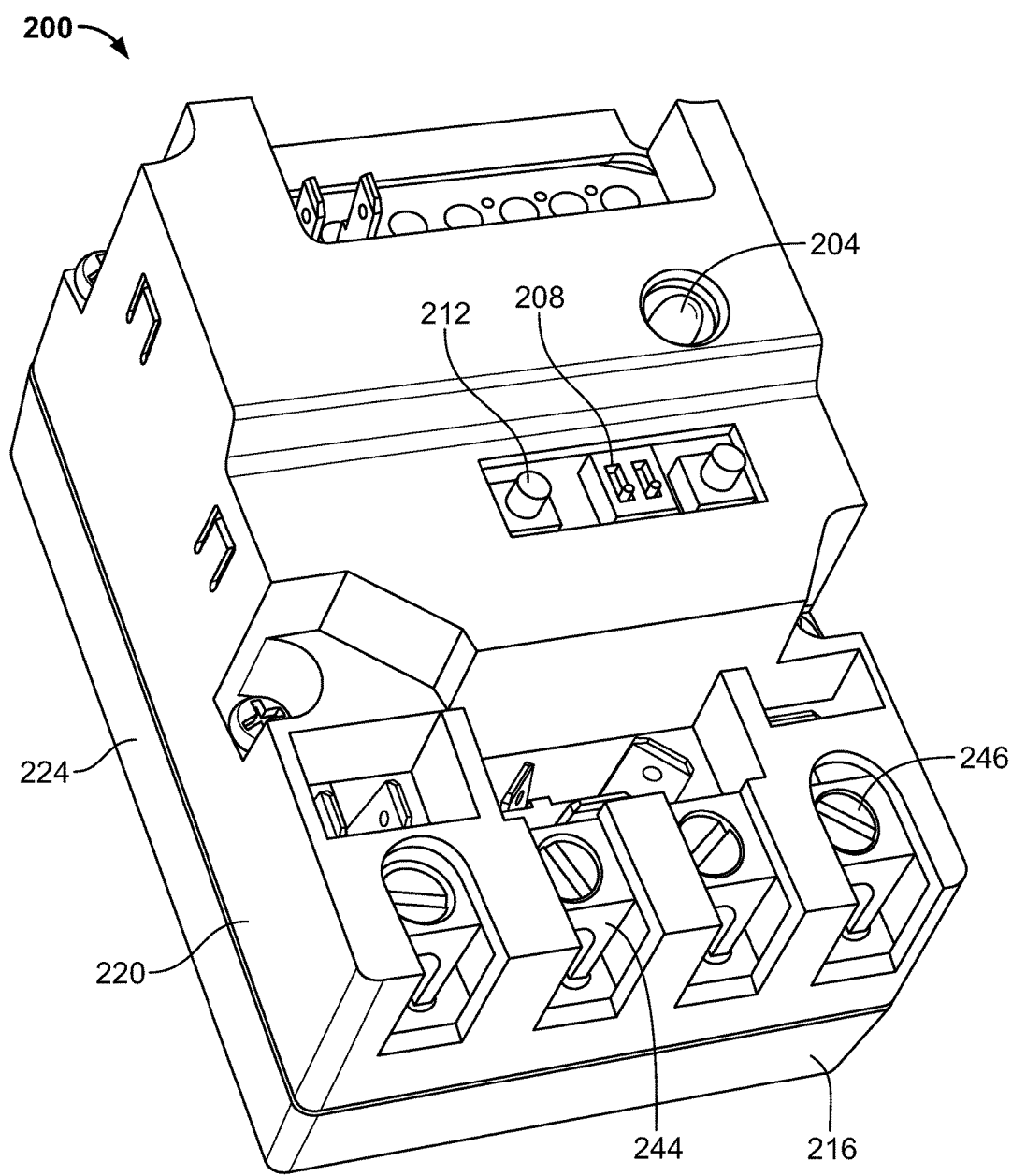
FIG. 9 is a left rear perspective view of an exemplary embodiment of a relay switch control.
Figure 10:
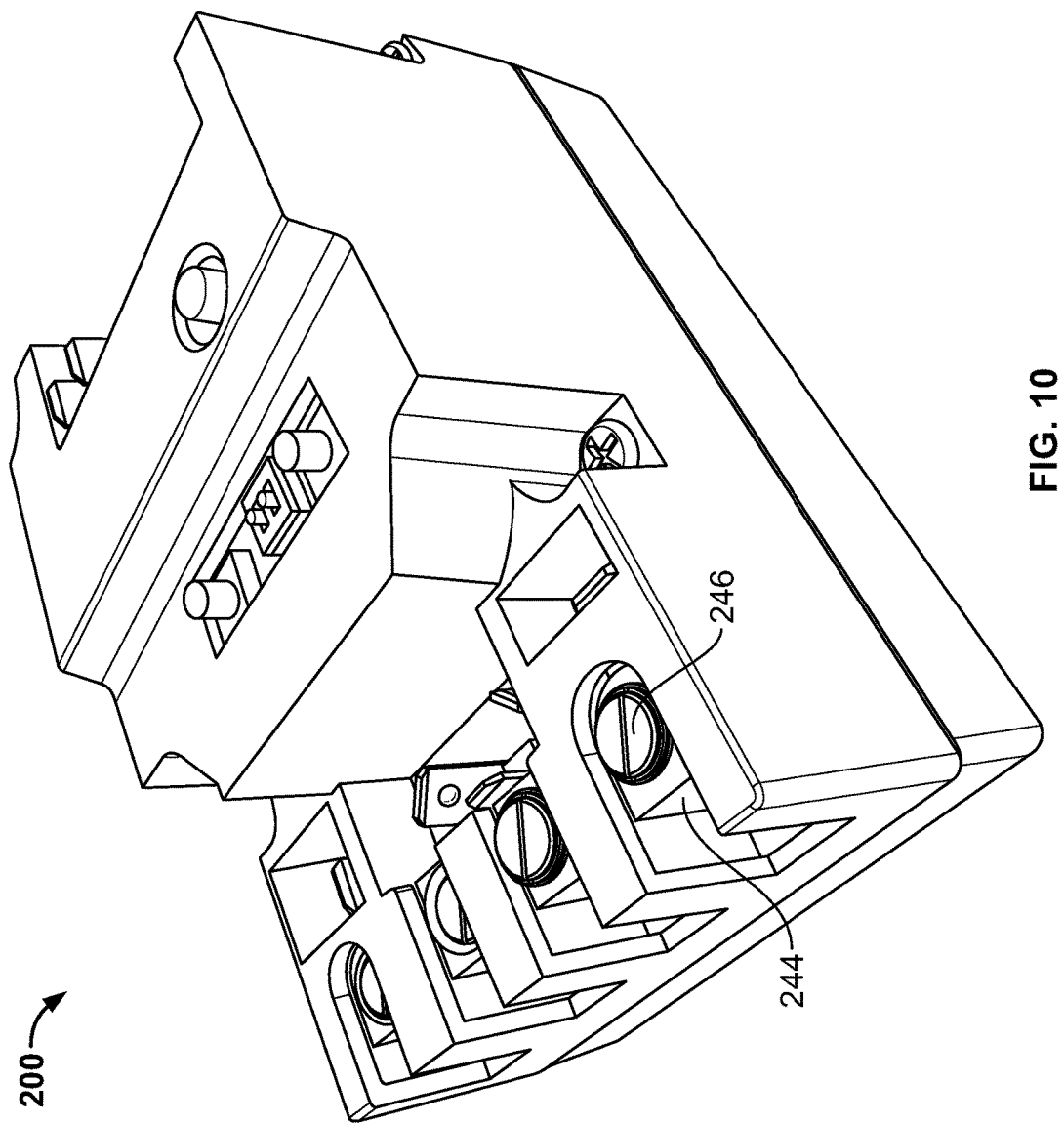
FIG. 10 is a right rear perspective view of the control shown in FIG. 9.
Figure 11:
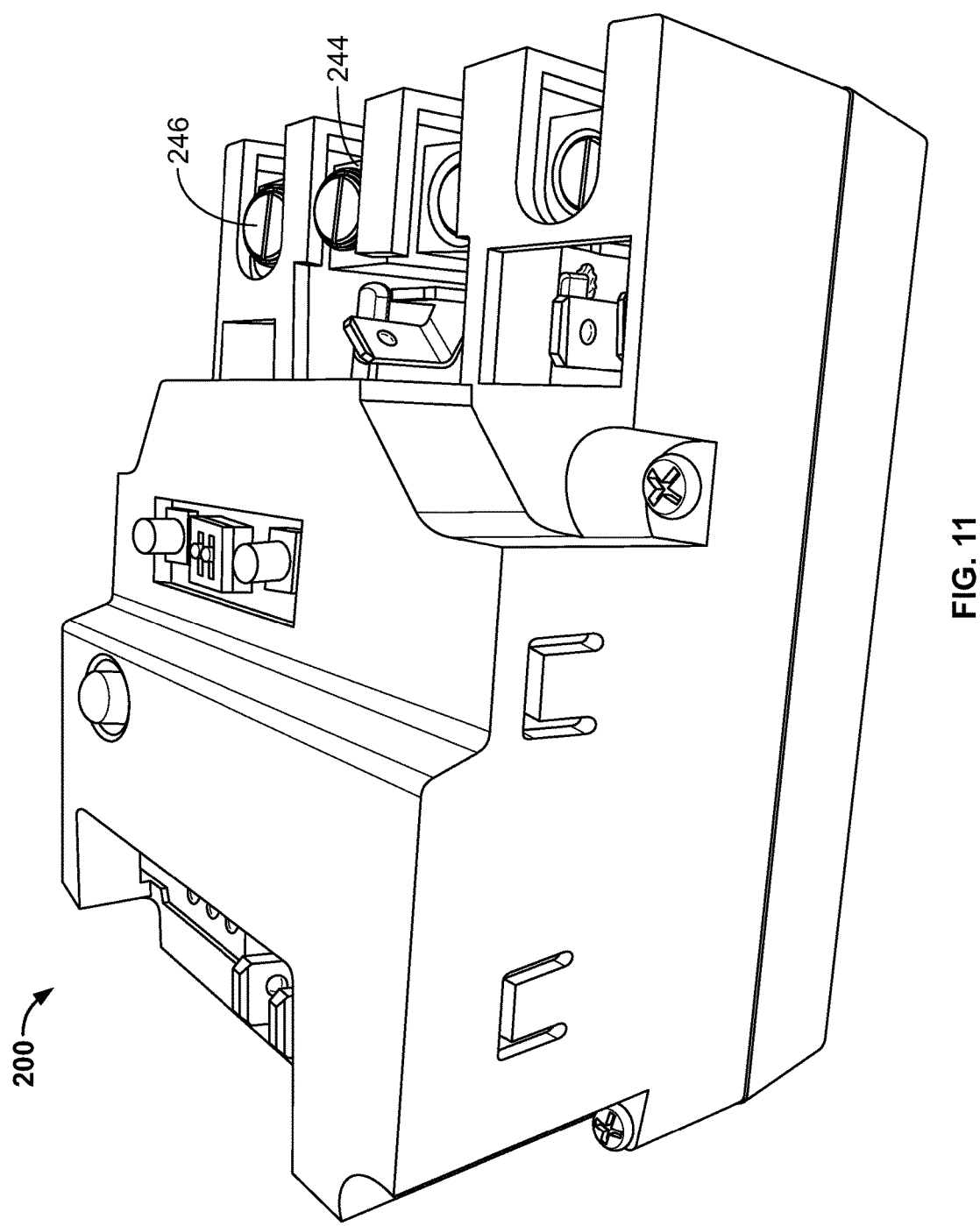
FIG. 11 is a left side perspective view of the control shown in FIG. 9.
Figure 12:
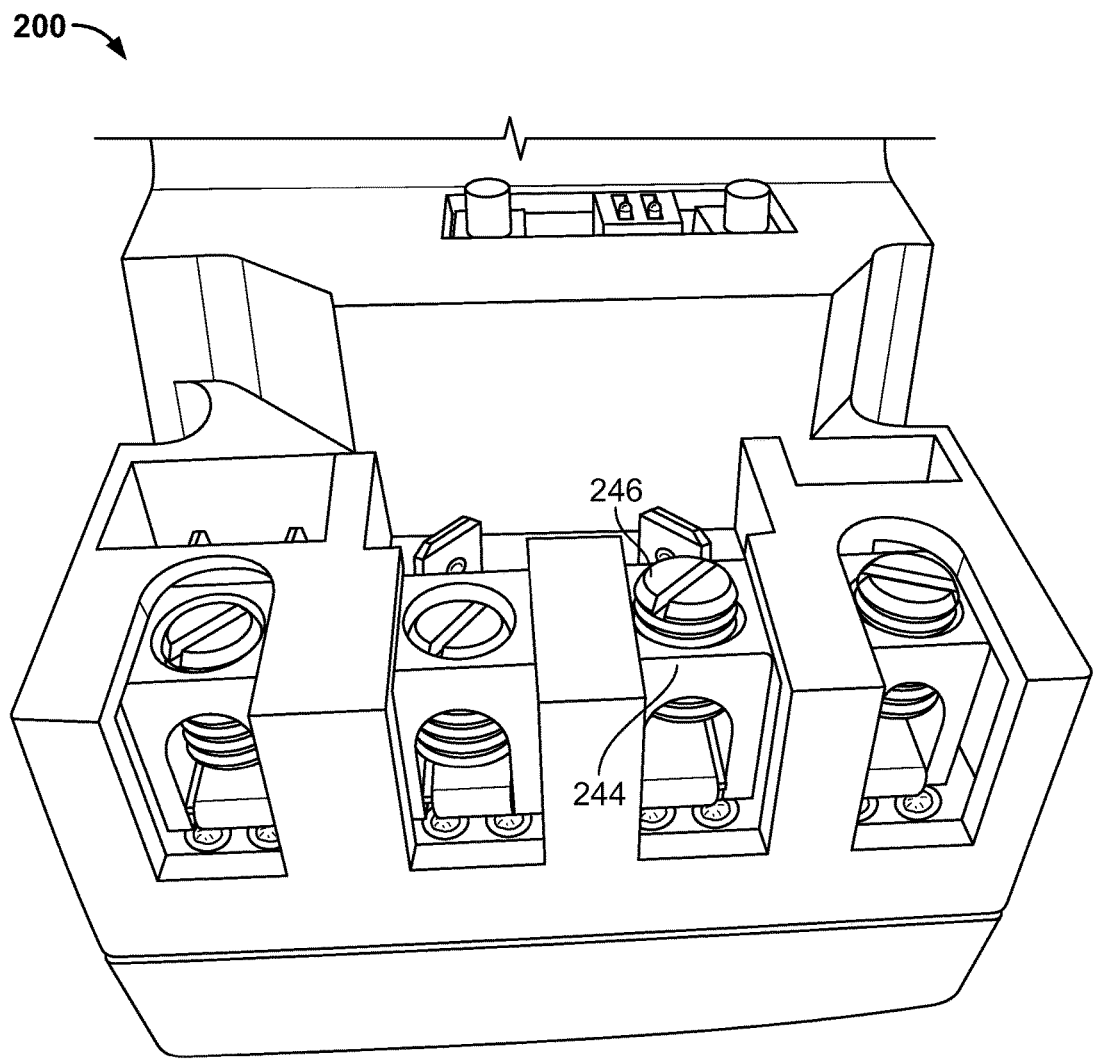
FIG. 12 is a rear perspective view of the control shown in FIG. 9.
Figure 13:
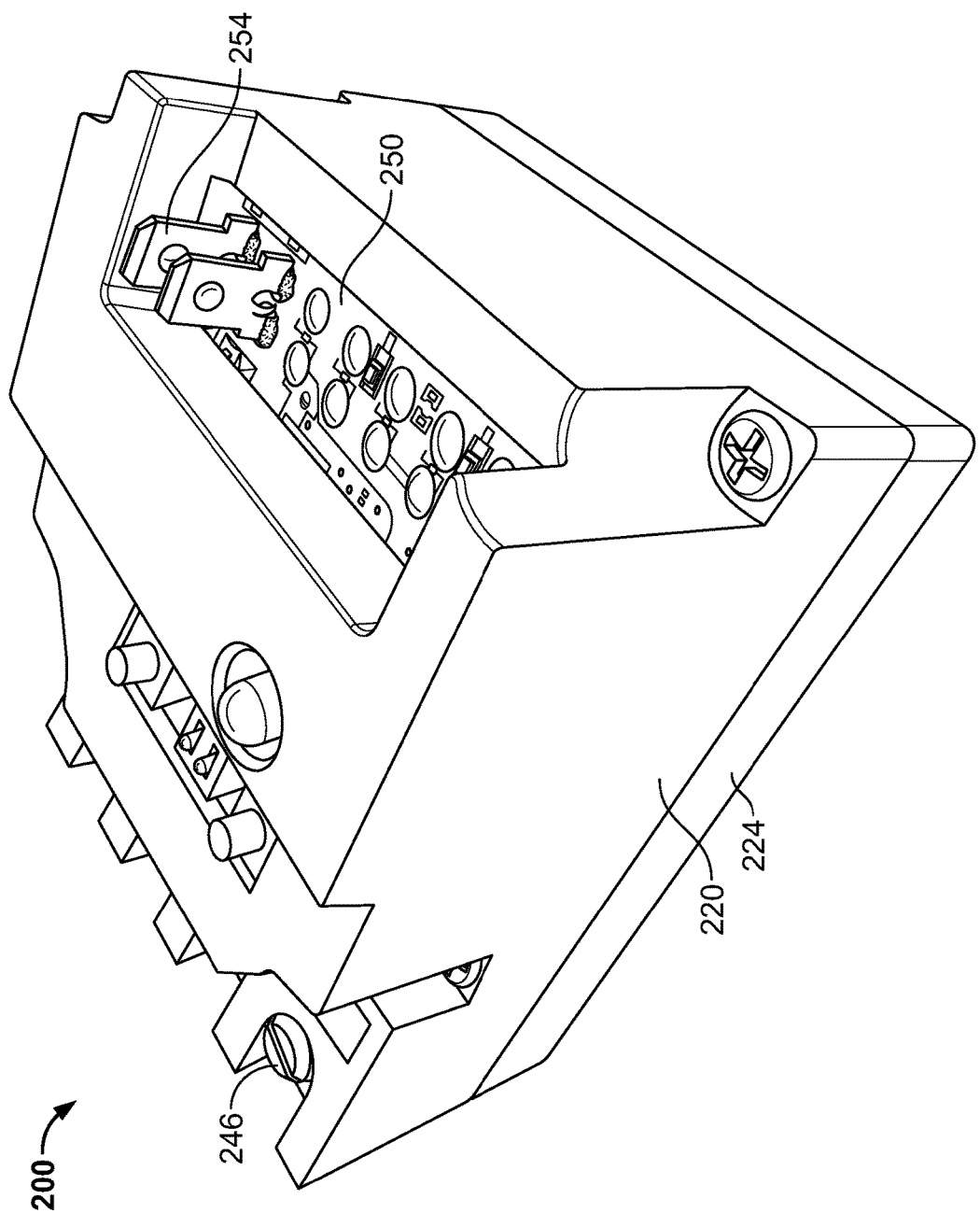
FIG. 13 is a right front perspective view of the control shown in FIG. 9.
Figure 14:
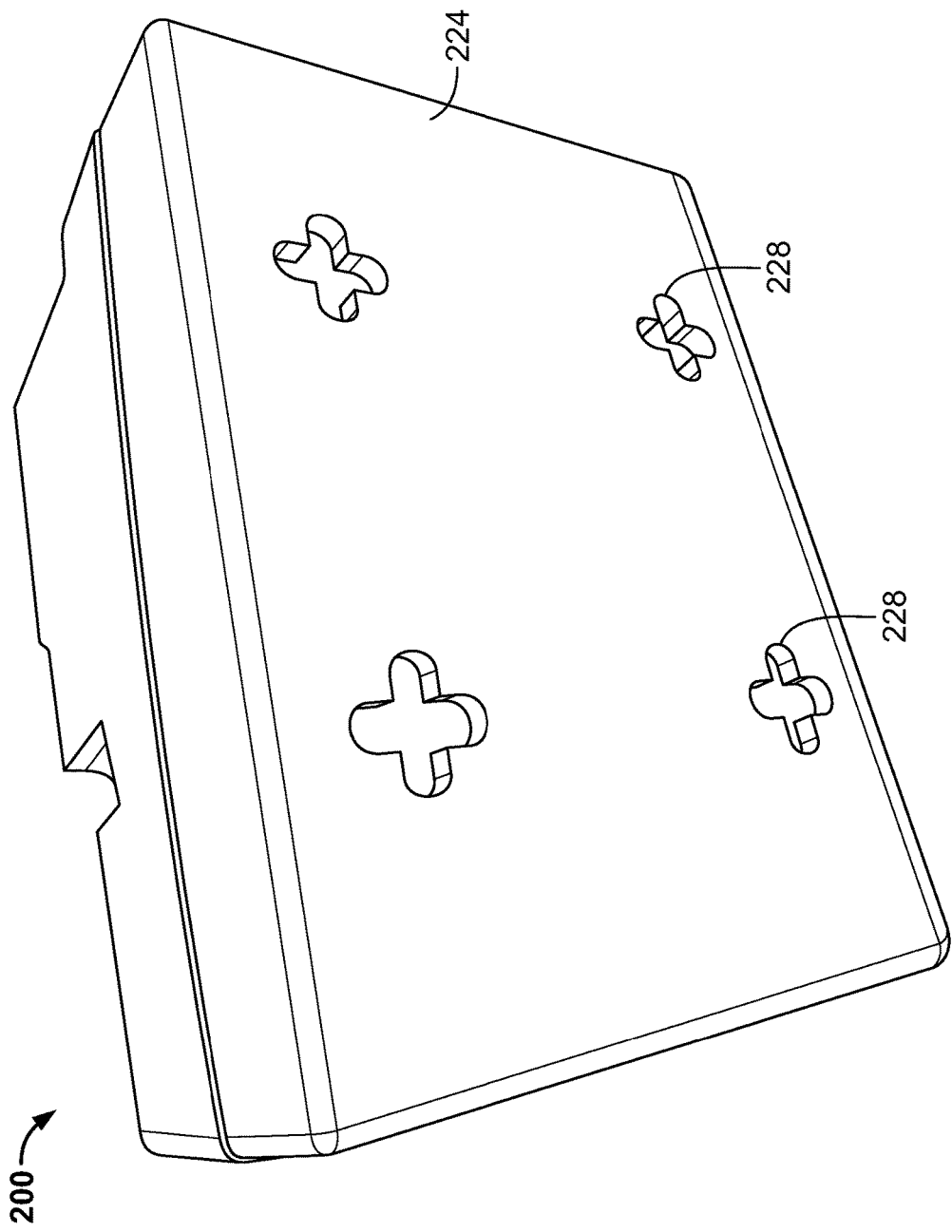
FIG. 14 is a bottom perspective view of the control shown in FIG. 9.

Another exemplary embodiment of a relay switch control or controller embodying one or more aspects of the present disclosure is indicated by reference number 200 in FIGS. 9-14. As shown in FIG. 9, the control 200 includes an LED 204, two dipswitches 208 disposed between two push buttons 212, and a housing 216. Lug connections 244 are shown with screws 246 for securing electrical connections. A PCB 250 on which a relay and processor are provided inside an upper cover 220 is shown in FIG. 13. Two connectors 254 are provided for connection, e.g., with a thermostat. FIG. 14 shows a bottom portion 224 of the control 200 in which mounting holes 228 are configured, e.g., to match with existing standard contactor holes for mounting. The mounting holes 228 are oblong or elongated in both directions to provide added positioning flexibility.

Figure 15:
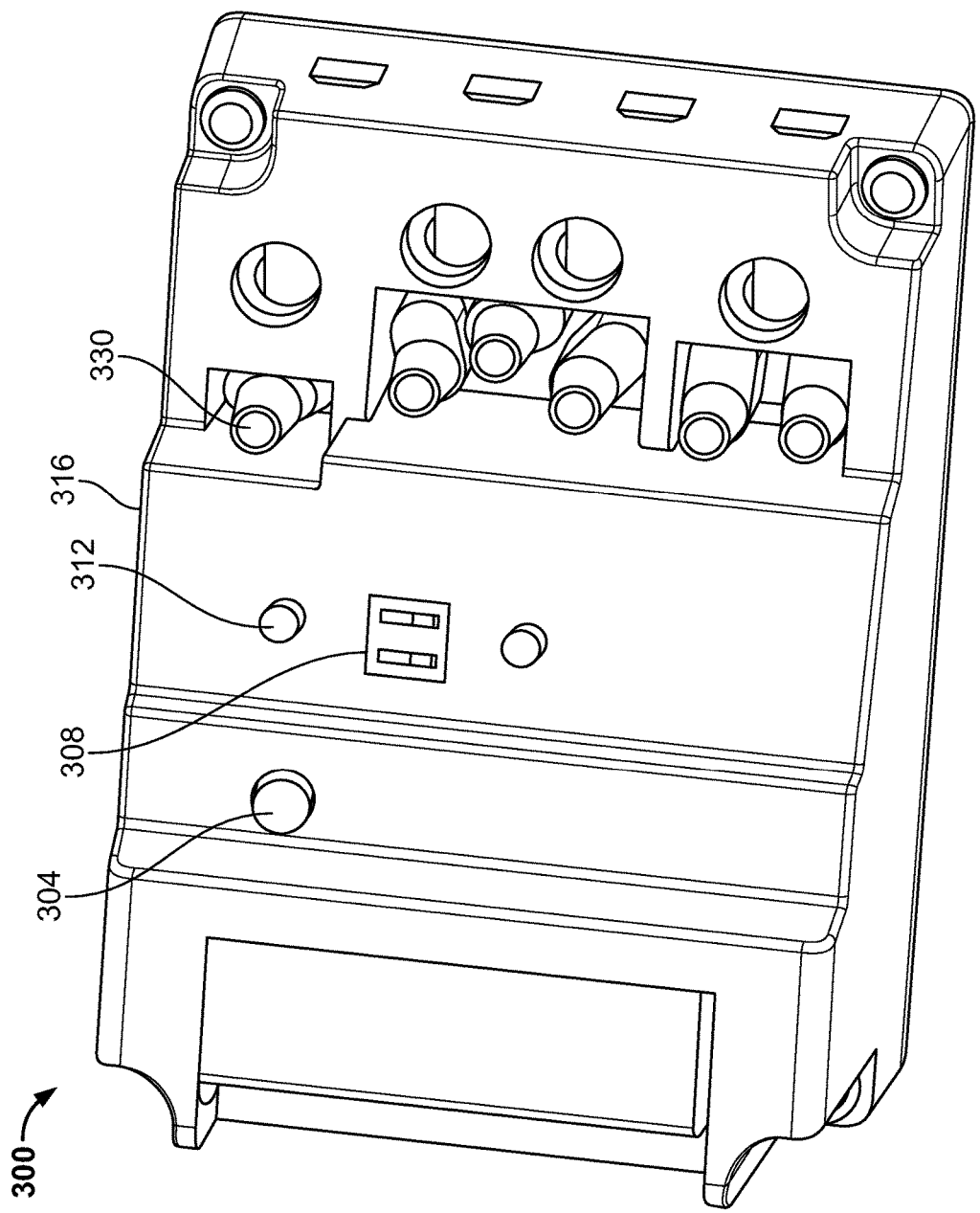
FIG. 15 is a top perspective view of a relay switch control according to another exemplary embodiment.

FIG. 15 illustrates another exemplary embodiment of a relay switch control or controller 300 embodying one or more aspects of the present disclosure. As shown in FIG. 15, the control 300 includes an LED 304, two dipswitches 308 disposed between two push buttons 312, a housing 316, and wire connectors 330.

As noted above, if power is lost on a utility grid, then thousands of climate control systems, as well as other types of systems and units that use line power, typically shut down at the same time. When power is restored, the systems and units typically all try to turn on at the same time, which could overload the electric utility and cause it to shut down. Accordingly, the inventors hereof have developed and disclose herein an exemplary method by which such an overload situation might be avoided, i.e., by randomly delaying the energizing of systems, units and components (hereinafter collectively and without limitation referred to as "apparatuses") that use line power. Randomly delaying the energizing of a plurality of apparatuses that use line power can help to spread out high in-rush currents over time to reduce (and possibly prevent) an overloading of an electrical grid. For example, the first apparatuses to energize after restoration of power would already be running at their lower steady state currents, before other apparatuses would first be energized and drawing in-rush current.

In one exemplary implementation, a motor in a climate control system is one apparatus for which a random start capability is provided. A random delay before startup may be activated as to the motor, e.g., after a blackout or shed event initiated by a utility. In various embodiments, random delays can be provided respectively as to a plurality of motors and other apparatuses, by virtue of variation in the internal clocks of processors of controls for the apparatuses. Such clocks can be generated by a crystal, resonator, internal RC clock circuit, etc. The clocks are analog based, and so typically no two controls have exactly the same clock speed. Due to variations in processor internal clocks or oscillators, motor controls and/or controllers that sense zero-crossing of line voltage may sense zero-crossing at slightly different times after a system power-up. Relay switch controls, for example, may close relay switch contacts to power a motor, on sensing zero cross. Such controls may use inputs that indicate where zero crossing edges are for 50 or 60 Hz power lines. Such an input is typically called "sync" for cooling controls.

Most if not all control processors have an internal counter that runs nonstop. When the counter overflows, it starts over at zero. The rate at which the counter increments is a direct function of the clock speed of the processor. Accordingly, and with few if any exceptions, no two counters increment at exactly the same rate.

Figure 16:
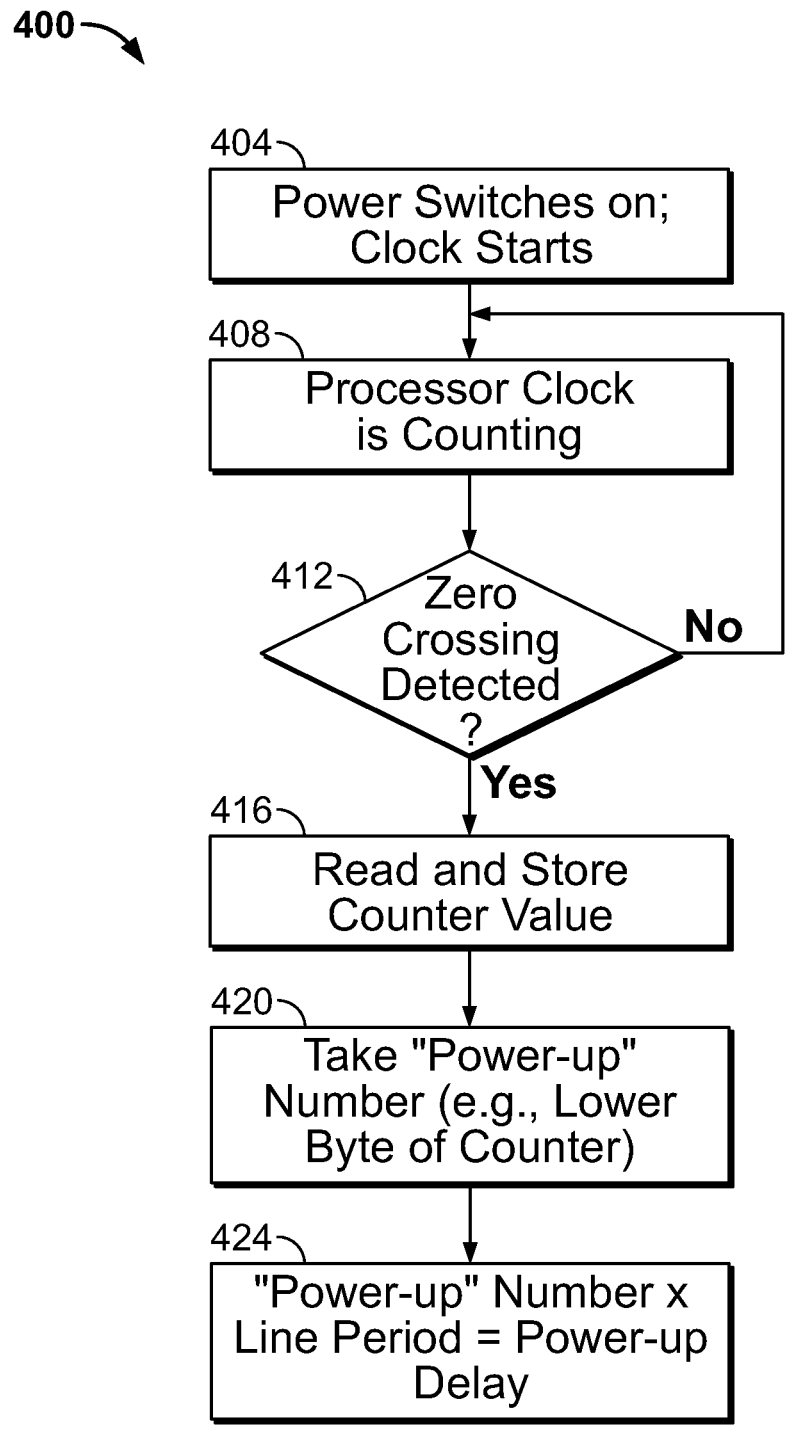
FIG. 16 is a flow diagram of a method of providing a random start capability for a motor in accordance with an exemplary implementation of the present disclosure.

A flow diagram of an example implementation of a method of providing an apparatus with a random start capability is indicated in FIG. 16 by reference number 400. In process 404, when line voltage is first switched on, the internal clock of a processor of a control of the apparatus starts running. In process 408 the processor's counter is incremented while the processor waits to detect a line voltage zero crossing, e.g., as indicated by a sync input. As with the processor clock circuitry, no two controls would have exactly the same zero cross voltage detection circuitry. Thus, zero crossing will be interpreted at slightly different times by different controls. In process 412, when a zero cross is detected, then in process 416 at least a portion of the current value of the counter is read and stored in a memory location. In process 420 at least a portion of the stored value, e.g., the lower eight bits of the counter, is designated as a "power-up number." Thus, in the present example implementation, the power-up number has some value in the range of 0-255. For a large number of controls, the distribution of the number selected typically would be fairly evenly spread out over the entire 256 total number range from 0 to 255. It should be noted, however, that other or additional combinations of bits could be selected for use in obtaining a power-up number.

In process 424, a power-up delay value is obtained by multiplying the power-up number by the amount of time for one line cycle period, e.g., 16.667 milliseconds for 60 Hertz. In this way, a power-up delay value is obtained in an example range of 0-4.25 seconds. Thus, for example, over the course of about 4.25 seconds after electric grid power is restored, compressors and other apparatuses controlled by controls in which the present example method is implemented would be energizing at different times so that in-rush current consumed by those apparatuses would be distributed over a 4.25-second time period.

The exemplary random startup delay methods and apparatus disclosed herein may provide one or more advantages and improvements. For example, each control determines its own random startup delay time, e.g., when it is powered up for the first time. As another example, large numbers of the same control type could be used on the same grid without risk that they all might energize their compressors or other apparatuses at the same time.

In an exemplary embodiment, a power-up number may be stored in a memory associated with the control (e.g., a non-volatile EEPROM onboard the control, etc.) such that the power-up number is usable by the control at each power-up. In this way, the delay is a constant for each individual control and it behaves the same way each time. In testing of a control, a zero may be loaded for the power-up number, thereby making the startup delay zero, to shorten the amount of time needed to test the control and/or make each control the same.

In the present exemplary implementation, a random delay is activated any time the motor is started after a shut down. Because processor internal clocks are different, the time at which a processor of a control senses zero cross is slightly different from one control to the other. As a result, various motors, compressors, etc. start (i.e., draw power) at slightly different times after a startup of line power. This can be an ideal method for starting a group of motors, for example, after a load shed period has ended. This random start concept could be used on a motor control or compressor control, such as the control discussed above or other controls.

Accordingly, exemplary embodiments may include a compressor control configured to implement this exemplary method and random start concept disclosed herein such that a group of compressors are not started all at the same time, for example, after a load shed period has ended. Other exemplary embodiments may include a motor control configured to implement this exemplary method and random start concept disclosed herein such that a group of motors are not started all at the same time, for example, after a load shed period has ended. Implementations of the foregoing random start concept and method are not limited to use in relation to only one type of apparatus. Appliances, motors, compressors, etc., and any HVAC appliance that contains a compressor, are a few of the apparatus types for which exemplary methods may be implemented. Such methods could also be useful in relation to appliances that contain large motor loads that typically have in-rush currents associated with them. Another use could in relation to locations that contain large numbers of incandescent bulbs.

By way of example only, one or more of (but not necessarily any or all of) the following features, functions, and benefits may be provided through various embodiments of the foregoing relay switch controls and related methods disclosed herein. For example, reliability may be improved, at least due to the following features. (a) Control relay contacts are enclosed in a seal, thereby preventing insects and contaminants from getting into the relay. (b) Relay smart "zero cross" switching can minimize contact damage and improve cycle life. (c) Line voltage brownout protection is selectable to deactivate operation in excessively low voltage conditions, on start-up and/or during run. (d) Short cycle protection is selectable, e.g., to maintain equal system pressure conditions. (e) The latching relay in various embodiments can reduce or eliminate chatter and can reduce VA draw.

As another example, ease of servicing may be improved through provision of the "TEST" push button, which can be used to obtain a powered test of compressor and fan. Embodiments of the above described LED also can make servicing easier, e.g., by providing control and system information for faster troubleshooting. Retention and display of cycle counts make it possible to track a history of product use. Embodiments of the foregoing relay switch controls can be easily installed, e.g., because typically no new wiring is required, and because lug connectors are provided to facilitate compressor and power wiring. Random start delays as disclosed herein can be implemented, e.g., to protect multi-unit installations from a large usage surge, e.g., on restart after a shed event. Such delays are provided as separate from short cycle protection and are not prompted by normal thermostat cycling. Through random start delays, reliability can be improved for both climate control system owners and utilities.

Embodiments of the foregoing control may include a reliable one-million-cycle rated, sealed electronic switch that nearly eliminates contact welding and pitting. The switch is provided in a seal that prevents insects, ants, and debris from entering the switch and saves on pest control treatment.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A relay switch control comprising:
a processor configured to receive control signals from a thermostat and having an internal analog-based clock upon which an operating frequency of the processor is based, whereby the cycles of the internal analog-based clock and the operating frequency of the processor of the relay switch control are individualized to the relay switch control; and
a relay operable by the processor, in response to thermostat control signals, to electrically connect or disconnect a load to or from a voltage input received by the relay switch control from a line voltage source, where the relay switch control is configured for connection between the line voltage source and the load;
the processor of the relay switch control further configured to:
detect a line voltage signal indicating startup of line power to the load;
detect a zero crossing of a signal of the line voltage source;
upon detection of the zero crossing of the signal of the line voltage source, store at least a portion of a current value of a counter of the processor, wherein the counter is configured to update based on the cycles of the internal analog-based clock, whereby the stored value of the counter is based on a time of detection of the zero crossing of the signal of the line voltage source and individualized to the relay switch control; and
combine the portion of the stored value of the counter with a value of a cycle period length of the line voltage signal to obtain a randomized number for use as a time delay before startup of the load, whereby the time delay is random and individualized to the relay switch control based on line voltage signal and relay switch control determinants;
the relay switch control configured to start power to the load from the line voltage source through the relay after the time delay.

2. The relay switch control of claim 1, wherein the relay is substantially enclosed in a seal.

3. The relay switch control of claim 1, wherein:
the load includes a compressor motor; and
the relay switch control further comprises a lockout selection device in communication with the processor and selectively operable by a user to enable or disable an operational lockout of the compressor after a predetermined number of failed attempts to start the compressor.

4. The relay switch control of claim 1, further comprising a multicolor light emitting diode (LED) operable by the processor to indicate one or more of the following: a number of cycles through which the relay has cycled, and a fault or status condition detected by the processor.

5. The relay switch control of claim 1 configured for connection between the line voltage source and a compressor in a climate control system, the control comprising a lockout selection device in communication with the processor and selectively operable by a user to enable or disable an operational lockout of the compressor after a predetermined number of failed attempts to start the compressor.

6. The relay switch control of claim 5, wherein the lockout selection device comprises one or more of the following: a dipswitch, a rotary switch, and a jumper.

7. The relay switch control of claim 5, wherein the lockout selection device is selectively operable to prevent an operational lockout of the compressor.

8. A relay switch control comprising:
a processor configured to receive control signals from a thermostat; and
a relay operable by the processor, in response to thermostat control signals, to electrically connect or disconnect a load to or from a voltage input provided to the relay switch control from a line voltage source, the relay substantially enclosed in a seal;
the relay switch control configured for connection as a unit between the line voltage source and the load, wherein,
the processor comprises an analog-based clock upon which an operating frequency of the processor is based; and
the processor is further configured to:
detect a line voltage signal indicating startup of line power to the load;
detect a zero crossing of a signal of the line voltage source;
upon detection of the zero crossing of the signal of the line voltage source, store at least a portion of a current value of a counter of the processor, wherein the counter is configured to update based on the cycles of the internal analog-based clock; and combine the portion of the stored value of the counter with a value of a cycle period length of the line voltage signal to obtain a randomized number for use as a time delay before startup of the load; and start power to the load from the line voltage source through the relay after the time delay having a length randomized by the processor using a value of a counter of the processor.

9. The relay switch control of claim 8, wherein:
the load includes a compressor motor; and
the control further comprises a lockout selection device connected with the processor and selectively operable by a user to enable or disable an operational lockout of the compressor after a predetermined number of failed attempts to start the compressor.

10. The relay switch control of claim 9, wherein the lockout selection device comprises one or more of the following: a dipswitch, a rotary switch, and a jumper.

11. The relay switch control of claim 9, wherein the lockout selection device is selectively operable to prevent an operational lockout of the compressor.

12. The relay switch control of claim 8, further comprising an indicator light and at least one pushbutton operable to provide input to the processor, the processor configured to selectively activate the indicator light based on the input.

13. The relay switch control of claim 12, wherein the indicator light comprises a multicolor light emitting diode (LED) operable by the processor to indicate one or more of the following: a number of cycles through which the relay has cycled, and a fault or status condition detected by the processor.

14. The relay switch control of claim 8, wherein:
the load includes a motor; and
the processor is configured to start the motor through the relay after the time delay.

15. A method of providing a random start capability for a line powered apparatus, the method comprising:
detecting a line voltage signal indicating startup of line power to the apparatus, the detecting performed by a processor of a relay switch control that receives voltage input from a line voltage source for providing the line voltage signal to the apparatus in accordance with control signals from a thermostat to the relay switch control;

upon detecting a zero cross of the line voltage signal, the processor storing at least a portion of a current value of a counter of the processor where the counter is updated based on cycles of an internal clock of the processor; and the processor combining the portion of the stored value with a value of a cycle period length of the line voltage signal to obtain a randomized number for use as a time delay before startup of the apparatus, where the randomized number provides a time delay of between zero to about five seconds, wherein the combining comprises multiplying the portion of the stored value with the value of the cycle period length of the signal, the relay switch control configured to start power to the load from the line voltage source through the relay after the time delay.

16. The method of claim 15, wherein:
the stored value is stored as a number of bits; and
the at least a portion of the stored value comprises at least some of the bits.

17. The method of claim 15, performed by a plurality of processors for a plurality of apparatus.

18. The method of claim 15, performed once as to the apparatus, the method further comprising using the same time delay for a plurality of subsequent startups of the apparatus.

19. The method of claim 15, performed at more than one startup of the apparatus.

20. The method of claim 15, wherein the apparatus includes a motor of a compressor.

21. The method of claim 20, wherein the relay switch control is connected with the compressor.

22. The method of claim 15, wherein the time delay provided by the randomized number is between zero and 5.1 seconds.

23. The method of claim 15, wherein the time delay provided by the randomized number is between zero and 4.25 seconds.

* * * * *